Feb. 3, 1953     R. CARTER     2,627,156

CUTTING BAR FOR MOWING MACHINES

Filed April 19, 1950

RAYMOND CARTER
*INVENTOR.*

BY

UNITED STATES PATENT OFFICE 2,627,156

CUTTING BAR FOR MOWING MACHINES

Raymond Carter, Wyoming, Ill.; Hazel Carter and Raymond Hugh Carter administrators of the estate of Raymond Carter, deceased Application April 19, 1950, Serial No. 156,897

2 Claims. (Cl. 56—295)

The instant invention relates to mowing machines, and more especially has reference to a cutting bar wherein the cutting surfaces or blades are attached to the bar in a novel manner. The application is an improvement on the cutting bar shown in my co-pending application Serial No. 18,272, filed March 31, 1948, now Patent No. 2,529,328 issued November 7, 1950, Mowing Machine.

In mowing machines of the type wherein the cutting blade is supported by the mowing machine frame for rotation about a vertical axis, the problem of preventing the cutting surface or blade from being damaged when the blade strikes a hard obstacle has been a troublesome one. To overcome this objectionable feature, the cutting blade section is attached to the supporting bar by means of a pair of spaced apart pins or rivets, one of which is adapted to be sheared off when the cutting blade strikes an obstacle, whereupon the blade will swing rearwardly beneath the cutting bar, thus preventing the blade from being broken.

An object of the present invention is to provide a detachable blade or cutting section for a rotatable cutting bar wherein the blade is supported on the bar in a rigid fashion, yet is capable of horizontal pivotal movement should the blade strike a relatively immovable object.

A further object of the present invention is to provide a rotatable cutting blade for mowing machines of the character described which includes few essential working parts, which is highly efficient in operation and which may be easily and inexpensively manufactured.

And yet another object of my invention is to provide a connection between the cutting blade or section and its supporting bar which may be readily replaced when necessary.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 1:
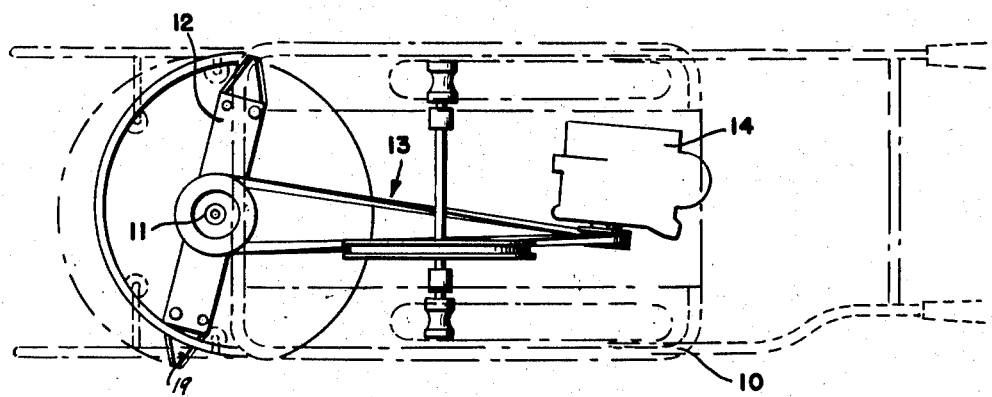
Figure 1 is a plan view of the cutting bar installed on the mowing machine, the mowing machine being shown partially in dotted lines.

As shown in Figure 1, the mowing machine is denoted generally 10, and a mandrel 11 is supported by the frame of the machine 10 adjacent the front end thereof, the lower end of the mandrel supporting a bar 12 for rotation about the vertical axis.

A suitable drive connection denoted 13 is provided between the mandrel 11 and a power plant 14 for imparting the necessary rotational movement to the mandrel and bar 12.

Figure 2:
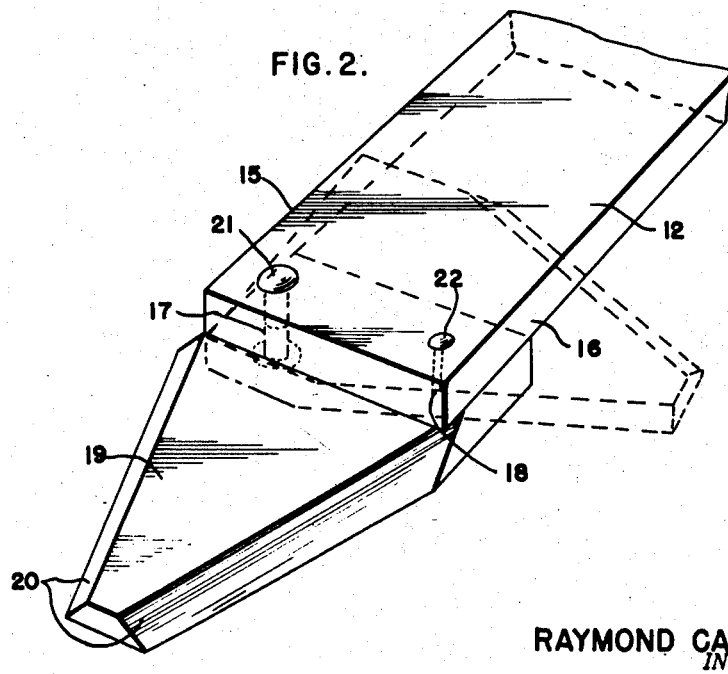
Figure 2 is a view in perspective on an enlarged scale of one end of the cutting bar, the dotted lines indicating the position of the cutting section when the frangible connection has been broken.

Referring to Figure 2, it will be noted that the bar 12 has a leading or front edge 15 and a trailing or rear edge 16. The bar may be of any suitable metal and is provided with a pair of spaced apart apertures 17 and 18 located near each end of the bar 12. A triangular cutting blade or section 19 having cutting edges 20 is adapted to be secured to each end of the bar 12. Each section 19 is provided with openings 17A and 17B adapted to underlie and register with the apertures 17 and 18 on the bar 12. The aperture 17 and its corresponding opening in the bar 19 are of greater diameter than the aperture 18 and its corresponding opening, and a rivet or the like 21 is lodged in the aperture 17 and the opening in the section 19. A shear pin type rivet 22 is disposed in the aperture 18 and the opening in the section 19, and it will be appreciated that the members 21 and 22 will fastly support the cutting section on the bar 12. Furthermore, it will be observed that the shear pin 22 is located adjacent the trailing edge of the bar 12, and in the event the cutting section 19 strikes a hard obstacle or object during the mowing process, the pin 22 will be sheared off, whereupon the section 19 can swing horizontally beneath the bar 12 about the rivet 21 to the position shown in the dotted lines. Consequently, by reason of this connection between the bar and the cutting section, there can be no danger of the cutting section being broken when the section hits or strikes a hard obstruction.

The shear pin may be readily and easily removed and replaced, and manifestly, the assembly requires little maintenance or upkeep costs.

It will be appreciated, therefore, that I have provided a relatively simple cutting bar for mowing machines of the type hereinabove described, which bar, by virtue of the connection between the bar and the cutting blade, can be used over extended periods of time, since the cutting blade is not apt to be broken or seriously damaged during the mowing operations. In addition, the cutting blade may be easily attached to or detached from the supporting bar without the necessity of employing a skilled workman.

The invention is not to be confined to any strict conformity with the showing in the drawing but may be changed or modified so long as such changes or modifications mark no material departure from the salient features of the invention as expressed in the appended claims.

I claim:

1. A cutting bar for use with mowing machines of the type wherein the bar is rotatable about a vertical axis comprising a support, a cutting blade located at each end of the support, a rigid pivot connection between the blade and the support adjacent the leading edge of the support, and a frangible connection of lesser cross-sectional area than the rigid connection between the blade and the support adjacent the trailing edge of the support so that the blade can swing beneath the support should the blade strike a hard obstacle.

2. A cutting bar as claimed in claim 1 wherein the rigid pivot connection is a rivet and the frangible connection is a shear pin.

RAYMOND CARTER.

REFERENCES CITED

The following references are of record in the file of this patent:

UNITED STATES PATENTS

| Number    | Name    | Date          |
|-----------|---------|---------------|
| 1,947,552 | Huddle  | Feb. 20, 1934 |
| 2,522,112 | Gilmour | Sept. 12, 1950|
| 2,529,328 | Carter  | Nov. 7, 1950  |